US012756461B2

(12) United States Patent
Katsukura

(10) Patent No.: US 12,756,461 B2
(45) Date of Patent: Oct. 6, 2026

(54) MONITORING CONTROL DEVICE, OPTICAL TRANSMISSION PATH MONITORING DEVICE, AND MONITORING CONTROL METHOD

(71) Applicant: NEC Corporation, Tokyo (JP)

(72) Inventor: Daisuke Katsukura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 447 days.

(21) Appl. No.: 18/398,562

(22) Filed: Dec. 28, 2023

(65) Prior Publication Data

US 2024/0235671 A1 Jul. 11, 2024

(30) Foreign Application Priority Data

Jan. 6, 2023 (JP) ................................ 2023-001261

(51) Int. Cl.
*H04B 10/079* (2013.01)

(52) U.S. Cl.
CPC ..... *H04B 10/0795* (2013.01); *H04B 10/0793* (2013.01)

(58) Field of Classification Search
None
See application file for complete search history.

(56) References Cited

U.S. PATENT DOCUMENTS

2011/0255860 A1* 10/2011 Lee .................... G01M 11/3136 398/10

FOREIGN PATENT DOCUMENTS

JP 2007-060665 A 3/2007
WO 2019/087520 A1 5/2019

* cited by examiner

*Primary Examiner* — David W Lambert
(74) *Attorney, Agent, or Firm* — Sughrue Mion, PLLC

(57) ABSTRACT

A monitoring control device and an optical transmission path monitoring device include a path information reception circuit for receiving optical path information indicating an optical path state when a path of signal light propagating through an optical transmission path is switched; and a transmission coefficient determination circuit for determining a transmission coefficient for use in monitoring a state of the optical transmission path by monitoring light depending on the optical path state.

20 Claims, 15 Drawing Sheets

MONITORING CONTROL DEVICE, OPTICAL TRANSMISSION PATH MONITORING DEVICE, AND MONITORING CONTROL METHOD

This application is based upon and claims the benefit of priority from Japanese Patent Application No. 2023-001261, filed on Jan. 6, 2023, the disclosure of which is incorporated herein in its entirety by reference.

TECHNICAL FIELD

The present disclosure relates to a monitoring control device, an optical transmission path monitoring device, and a monitoring control method, and particularly relates to a monitoring control device, an optical transmission path monitoring device, and a monitoring control method for use in an optical transmission system in which switching of an optical path is performed.

BACKGROUND ART

In a long distance optical transmission system such as a submarine optical transmission system, a system is known in which a state of an optical transmission path constituted of an optical repeater, an optical fiber, and the like is monitored by using a change in level of monitoring light in a specific wavelength band. One example of a system that monitors an optical transmission path as described above is described in Japanese Unexamined Patent Application Publication No. 2007-060665. In the monitoring system described in Japanese Unexamined Patent Application Publication No. 2007-060665, an optical transmission path of an optical transmission system is monitored by monitoring a feature of a gain characteristic with respect to a wavelength in the optical transmission path.

Further, in a submarine optical transmission system and the like, a configuration is adopted in which an optical switch is introduced in an optical transmission path, and a path of signal light propagating through the optical transmission path is switched (e.g., see International Patent Publication No. WO2019/087520).

SUMMARY

In a method of monitoring a state of an optical transmission path by analyzing a change in a gain characteristic, as exemplified by the above-described monitoring system, a change amount of the gain characteristic at a time of failure differs depending on whether wavelength multiplexed signal light is included in propagation light propagating through the optical transmission path. Meanwhile, in an optical transmission system configured in such a way as to switch a path of signal light propagating through an optical transmission path, whether wavelength multiplexed signal light is included in propagation light changes depending on an optical path state when a path is switched. Therefore, a change amount of the gain characteristic at a time of failure differs depending on the optical path state. Consequently, accuracy in determining a failure of an optical transmission path is lowered.

In this way, in an optical transmission system configured in such a way as to switch a path of signal light propagating through an optical transmission path, there is a problem that accuracy in determining a failure of the optical transmission path is lowered.

An exemplary object of the disclosure is to provide a monitoring control device, an optical transmission path monitoring device, and a monitoring control method that solve the above-described problem.

A monitoring control device according to the present disclosure includes: a path information reception means for receiving optical path information indicating an optical path state when a path of signal light propagating through an optical transmission path is switched; and a transmission coefficient determination means for determining a transmission coefficient for use in monitoring a state of the optical transmission path by monitoring light depending on the optical path state.

A monitoring control method according to the present disclosure includes: receiving optical path information indicating an optical path state when a path of signal light propagating through an optical transmission path is switched: and determining a transmission coefficient for use in monitoring a state of the optical transmission path by monitoring light depending on the optical path state.

With a monitoring control device, an optical transmission path monitoring device, and a monitoring control method according to the present disclosure, it is possible to improve accuracy when a failure of an optical transmission path is determined in an optical transmission system configured in such a way as to switch a path of signal light propagating through the optical transmission path.

BRIEF DESCRIPTION OF THE DRAWINGS

Exemplary features and advantages of the present disclosure will become apparent from the following detailed description when taken with the accompanying drawings in which.

EXAMPLE EMBODIMENT

Hereinafter, example embodiments according to the present disclosure are described with reference to the drawings.

First Example Embodiment

Figure 1:
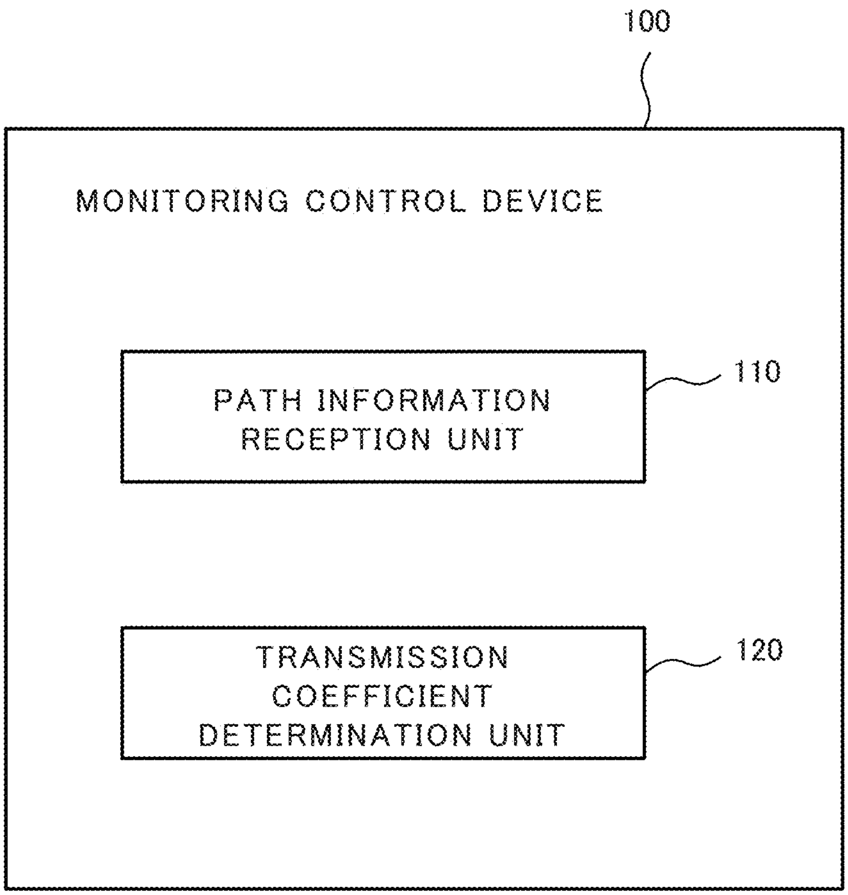
FIG. 1 is a block diagram illustrating a configuration of a monitoring control device according to a present disclosure.

FIG. 1 is a block diagram illustrating a configuration of a monitoring control device 100 according to a first example embodiment of the present disclosure. The monitoring control device 100 includes a path information reception unit (path information reception means) 110 and a transmission coefficient determination unit (transmission coefficient determination means) 120. The monitoring control device 100 is used in an optical transmission system configured in such a way as to switch a path of signal light propagating through an optical transmission path.

The path information reception unit 110 receives optical path information indicating an optical path state when a path of signal light propagating through an optical transmission path is switched. Then, the transmission coefficient determination unit 120 determines a transmission coefficient for use in monitoring a state of the optical transmission path by monitoring light depending on the optical path state.

In this way, the monitoring control device 100 according to the present example embodiment is configured in such a way that the transmission coefficient determination unit 120 determines a transmission coefficient depending on an optical path state. Therefore, even when an optical path state changes, it is possible to monitor a state of an optical transmission path by using an optimum transmission coefficient, and detect a failure. Consequently, in the monitoring control device 100 according to the present example embodiment, it is possible to improve accuracy when a failure of an optical transmission path is determined in an optical transmission system configured in such a way as to switch a path of signal light propagating through the optical transmission path.

The monitoring control device 100 may be configured to further include a storage unit (storage means) for storing in advance transmission coefficient information in which an optical path state and a transmission coefficient are associated with each other. In this case, the transmission coefficient determination unit 120 can determine a transmission coefficient by using transmission coefficient information. The transmission coefficient information is typically expressed in a table format.

The transmission coefficient includes a gain slope variation coefficient being a change amount of a gain slope in an optical amplifier with respect to input power to the optical amplifier disposed in an optical transmission path. Herein, the gain slope is a gradient when a light spectrum is approximated by a linear function.

The optical path information includes information indicating any of a first optical path state in which signal light is directed toward an own station, and a second optical path state in which signal light is directed toward another station.

Figure 2:
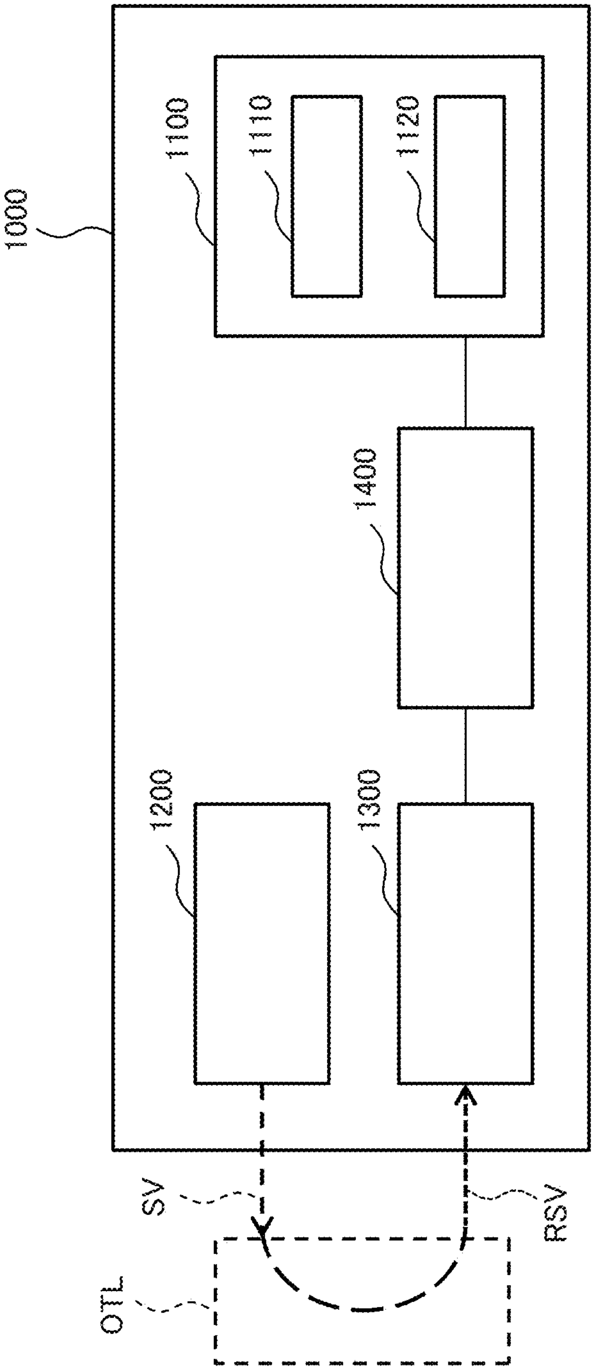
FIG. 2 is a block diagram illustrating a configuration of an optical transmission path monitoring device according to the present disclosure.

FIG. 2 illustrates a configuration of an optical transmission monitoring device 1000 including the above-described monitoring control device. The optical transmission path monitoring device 1000 includes a monitoring control device 1100, a monitoring light sending unit (monitoring light sending means) 1200, a monitoring light reception unit (monitoring light reception means) 1300, and a failure determination unit (failure determination means) 1400. A configuration of the monitoring control device 1100 is similar to a configuration of the above-described monitoring control device 100, and includes a path information reception unit 1110 and a transmission coefficient determination unit 1120.

The monitoring light sending unit 1200 sends monitoring light SV to an optical transmission path OTL. The monitoring light reception unit 1300 receives return light RSV in which the monitoring light SV is scattered in the optical transmission path OTL, and return light from each relay section. Then, the failure determination unit 1400 determines a failure of an optical transmission path by using light intensity of the return light RSV and a transmission coefficient.

In this way, the optical transmission path monitoring device 1000 according to the present example embodiment is configured in such a way that the transmission coefficient determination unit 1120 determines a transmission coefficient depending on an optical path state, and the failure determination unit 1400 determines a failure of an optical transmission path by using the transmission coefficient and light intensity of return light. Therefore, even when an optical path state changes, it is possible to monitor a state of an optical transmission path by using an optimum transmission coefficient, and detect a failure. Consequently, in the optical transmission path monitoring device 1000 according to the present example embodiment, it is possible to improve accuracy when a failure of an optical transmission path is determined in an optical transmission system configured in such a way as to switch a path of signal light propagating through the optical transmission path.

Next, a configuration and an operation of the optical transmission path monitoring device 1000 according to the present example embodiment are described in further detail.

Figure 3:
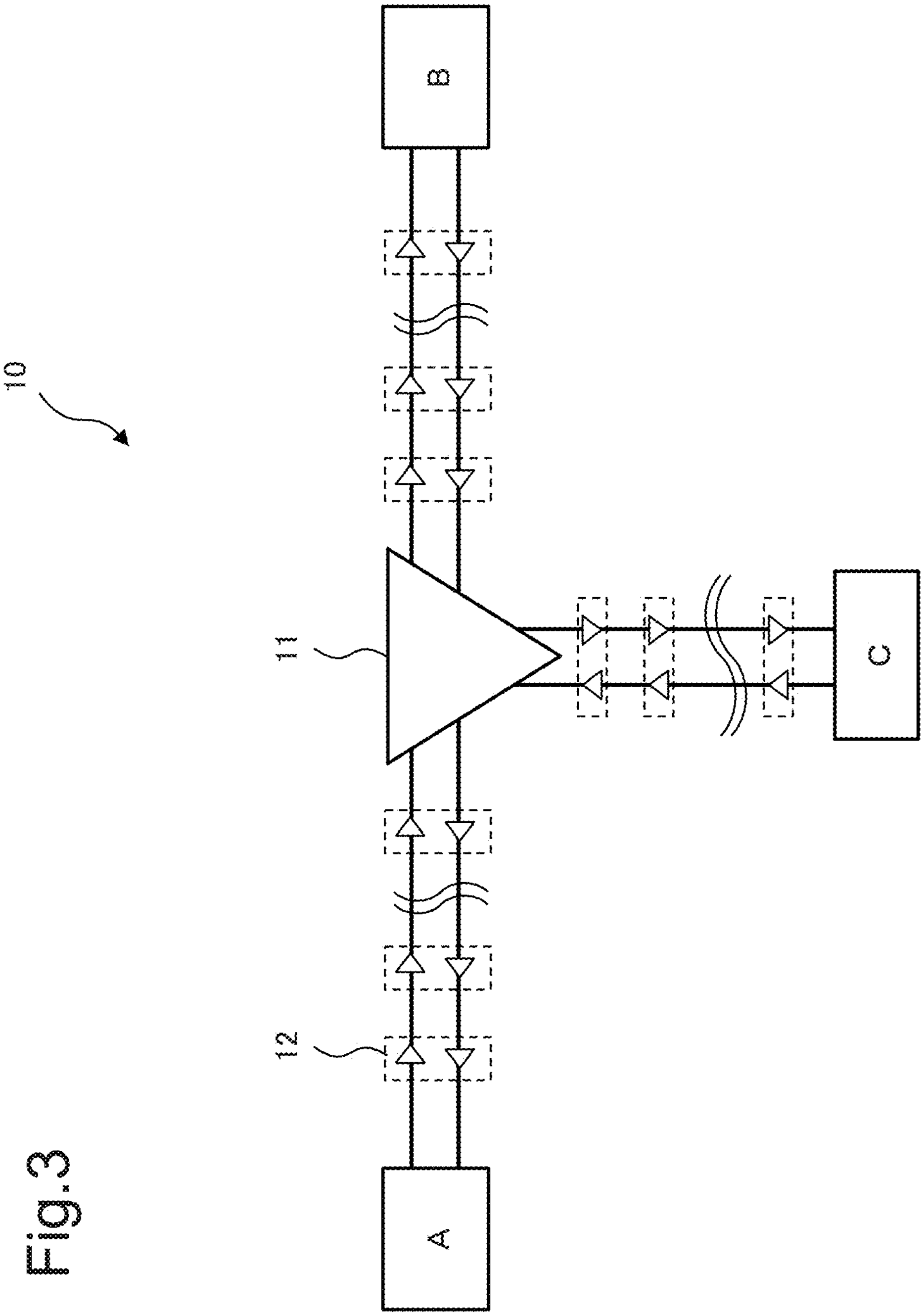
FIG. 3 is a block diagram illustrating one example of a configuration of an optical transmission system in which the optical transmission path monitoring device according to the present disclosure is used.

FIG. 3 illustrates one example of an optical transmission system configured in such a way as to switch a path of signal light propagating through an optical transmission path. An optical transmission system 10 includes terminal stations A, B, and C, each of which includes a terminal station device, an optical path switching device 11, and an optical repeater 12. The optical transmission path monitoring device 1000 is included in a terminal station device of each of the terminal station A, B, and C.

The optical path switching device 11 typically includes an optical switch or an optical add-drop multiplexer (OADM).

The optical repeater 12 includes an optical amplifier. As the optical amplifier, typically, an erbium doped fiber amplifier (EDFA) can be used. The optical repeater 12 further includes a loopback unit for inserting return light in which monitoring light is scattered in an optical transmission path into an opposing optical transmission path.

The optical path switching device 11, and a terminal station device included in each of the terminal stations A, B, and C are connected to each other by, for example, a fiber pair constituting an optical transmission path. Herein, a fiber pair (FP) is constituted of an optical fiber for uplink, and an optical fiber for downlink.

Figure 4:
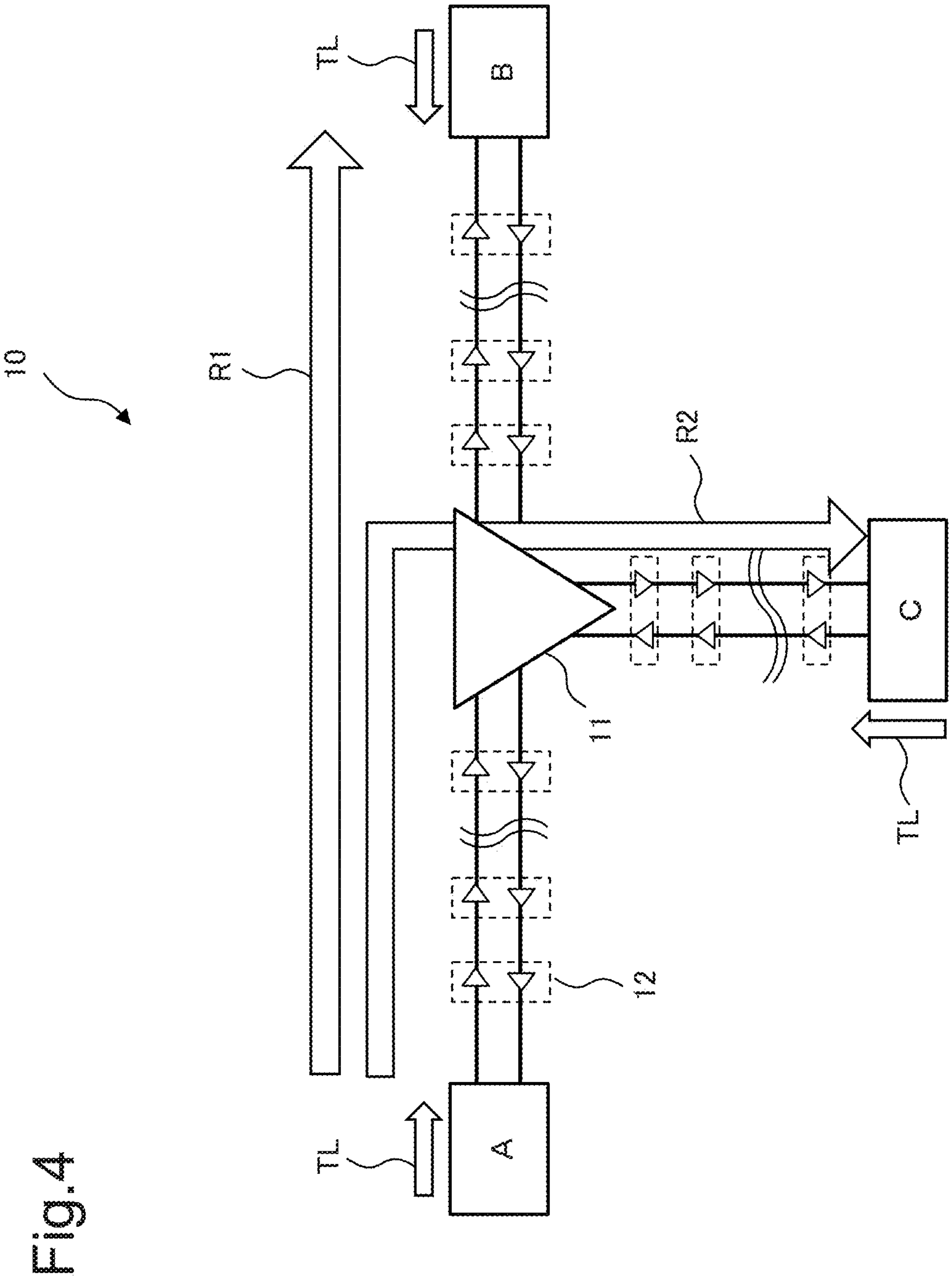
FIG. 4 is a diagram of the optical transmission system for describing an operation of the optical transmission path monitoring device according to the present disclosure.

In each terminal station device, for example, it is possible to determine a switching state of the optical path switching device 11 from light spectrum information of propagation light propagating through an optical transmission path, and recognize an optical path state of signal light. Then, the path information reception unit 1110 receives optical path information indicating an optical path state at this occasion. In this case, for example, in the optical transmission path monitoring device 1000 included in the terminal station B, optical path information includes information indicating any of a first optical path state R1 and a second optical path state R2. Herein, as illustrated in FIG. 4, the first optical path state R1 is an optical path state in which signal light sent from the terminal station A is directed toward the own station B. Further, the second optical path state R2 is an optical path state in which signal light is directed toward the other station C.

Herein, as illustrated in FIG. 4, an operation of the optical transmission path monitoring device 1000 is described by using, as an example, a case in which each of the terminal stations A, B, and C sends transmission light TL including at least one of wavelength multiplexed signal light WDM being signal light, and monitoring light SV.

Figure 5A:
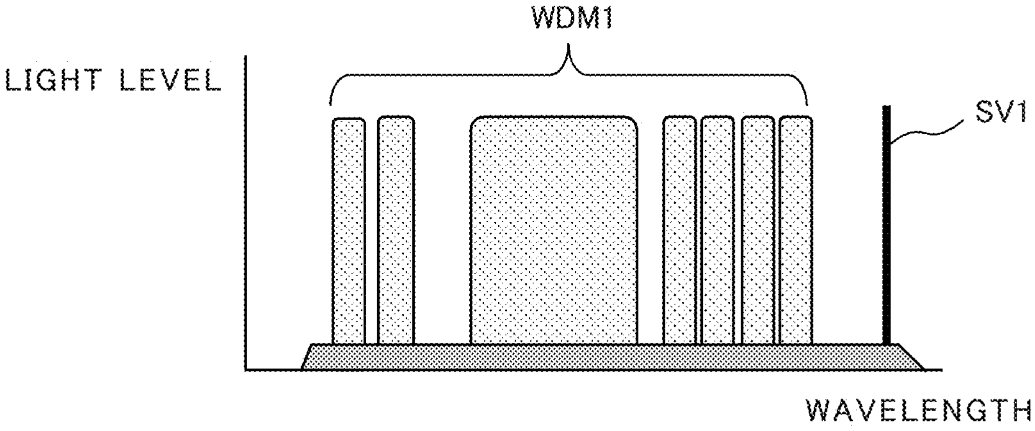
FIG. 5A is a diagram schematically illustrating a light spectrum of transmission light to be sent from a terminal station A in the optical transmission system in which the optical transmission path monitoring device according to the present disclosure is used.
Figure 5B:
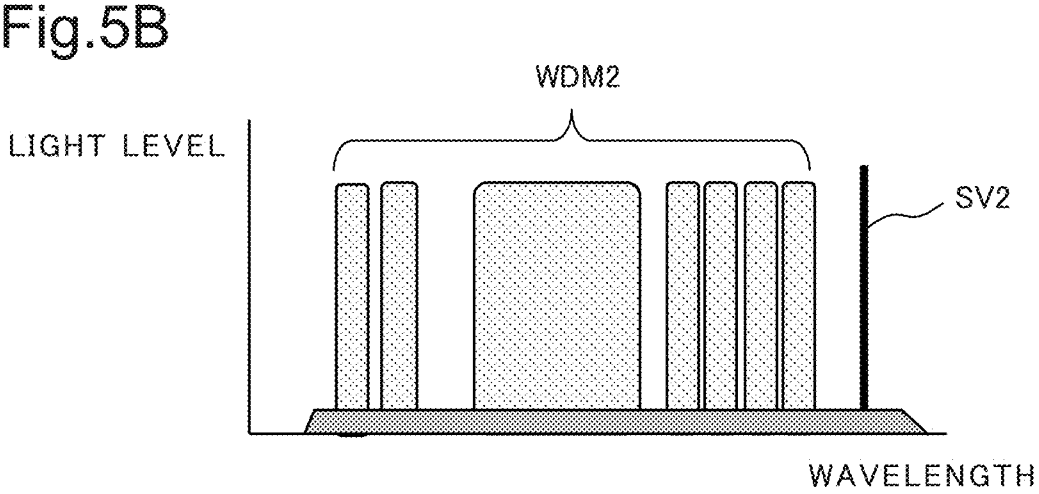
FIG. 5B is a diagram schematically illustrating a light spectrum of transmission light to be sent from a terminal station B in the optical transmission system in which the optical transmission path monitoring device according to the present disclosure is used.
Figure 5C:
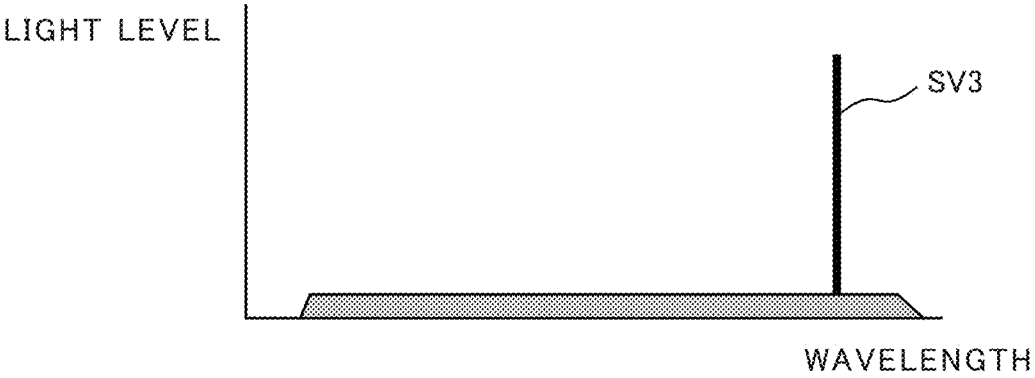
FIG. 5C is a diagram schematically illustrating a light spectrum of transmission light to be sent from a terminal station C in the optical transmission system in which the optical transmission path monitoring device according to the present disclosure is used.

FIGS. 5A, 5B, and 5C schematically illustrate a light spectrum of transmission light TL to be sent from each of the terminal stations A, B, and C, when a switching state of the optical path switching device 11 is the first optical path state R1. Herein, it is assumed that a wavelength of monitoring light SV1, SV2, and SV3 to be inserted from each of the terminal stations A, B, and C by the optical transmission path monitoring device 1000 is different from one another.

As illustrated in FIG. 5A, monitoring light SV1 is sent together with wavelength multiplexed signal light WDM1 from the terminal station A. Likewise, as illustrated in FIG. 5B, monitoring light SV2 is sent together with wavelength multiplexed signal light WDM2 from the terminal station B. On the other hand, since a path is not selected in the terminal station C, wavelength multiplexed signal light WDM is not sent, and as illustrated in FIG. 5C, only monitoring light SV3 is sent from the terminal station C. Therefore, even when a path is not selected, it is possible to monitor an optical transmission path.

Figure 6A:
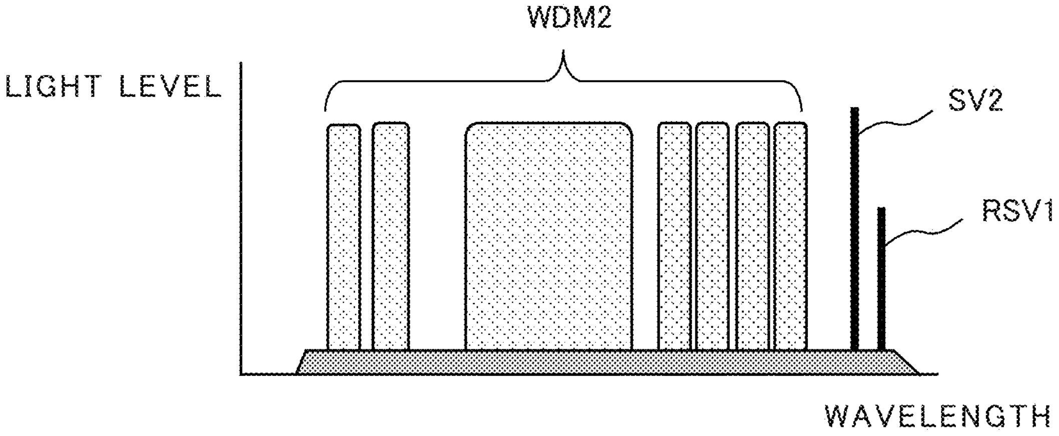
FIG. 6A is a diagram schematically illustrating a light spectrum of propagation light to be received by the terminal station A in the optical transmission system in which the optical transmission path monitoring device according to the present disclosure is used.
Figure 6B:
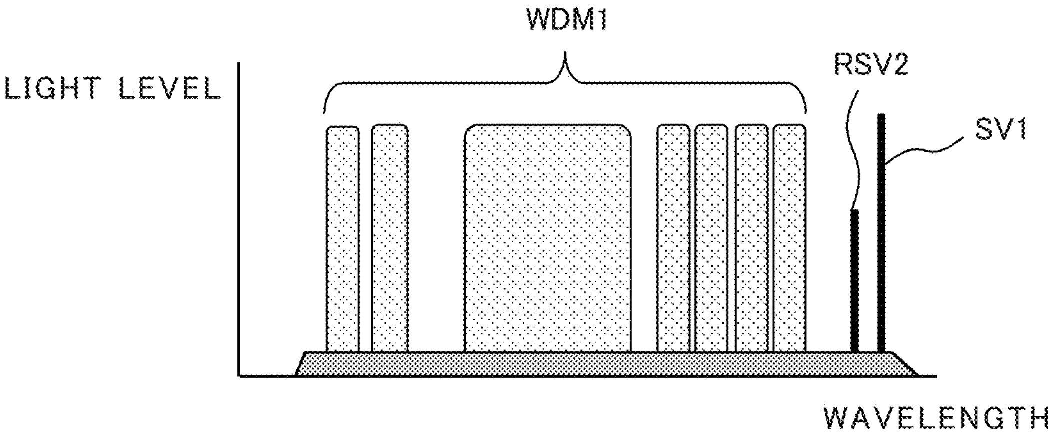
FIG. 6B is a diagram schematically illustrating a light spectrum of propagation light to be received by the terminal station B in the optical transmission system in which the optical transmission path monitoring device according to the present disclosure is used.
Figure 6C:
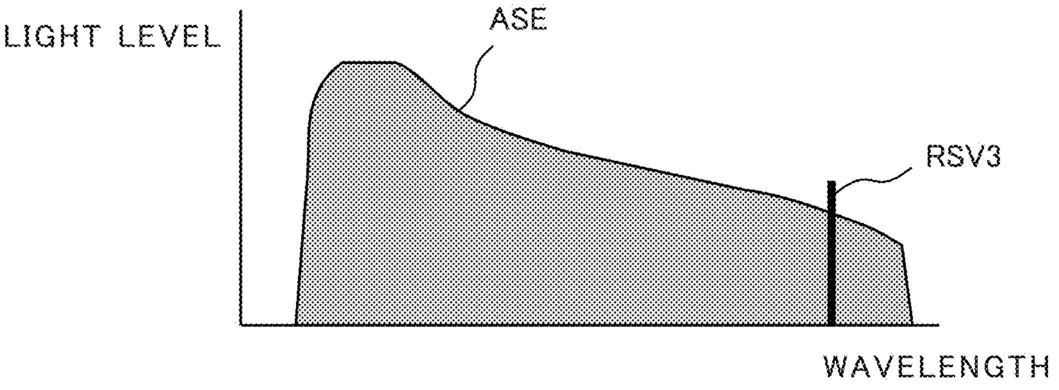
FIG. 6C is a diagram schematically illustrating a light spectrum of propagation light to be received by the terminal station C in the optical transmission system in which the optical transmission path monitoring device according to the present disclosure is used.

FIGS. 6A, 6B, and 6C schematically illustrate a light spectrum of propagation light to be received by each of the terminal stations A, B, and C, when a switching state of the optical path switching device 11 is the first optical path state R1. In this case, in the terminal stations A and B in which a path is selected, monitoring light SV1 and SV2 from the opposing station, and return light RSV1 and RSV2 by monitoring light from the own station are received together with wavelength multiplexed signal light WDM1 and WDM2. In contrast, since a path is not selected in the terminal station C, there is no likelihood that wavelength multiplexed signal light WDM is received. In the terminal station C, amplified spontaneous emission (ASE) light to be output from an optical amplifier included in the optical repeater 12, and return light RSV3 by monitoring light SV3 from the own station are received.

Note that, even when a switching state of the optical path switching device 11 becomes the second optical path state R2, although a light spectrum in the terminal stations B and C is replaced, a similar result is acquired.

In this way, when a path of signal light is in the first optical path state R1, wavelength multiplexed signal light WDM being signal light is included in propagation light directed toward the own station. On the other hand, when a path of signal light is in the second optical path state R2, wavelength multiplexed signal light WDM is not included in propagation light. Therefore, as described above, a change amount of a gain characteristic in an optical amplifier, in other words, a transmission coefficient differs depending on an optical path state of signal light. Herein, a gain slope variation coefficient being a change amount of a gain slope in an optical amplifier with respect to input power to the optical amplifier disposed in an optical transmission path is included in the transmission coefficient.

Figure 7:
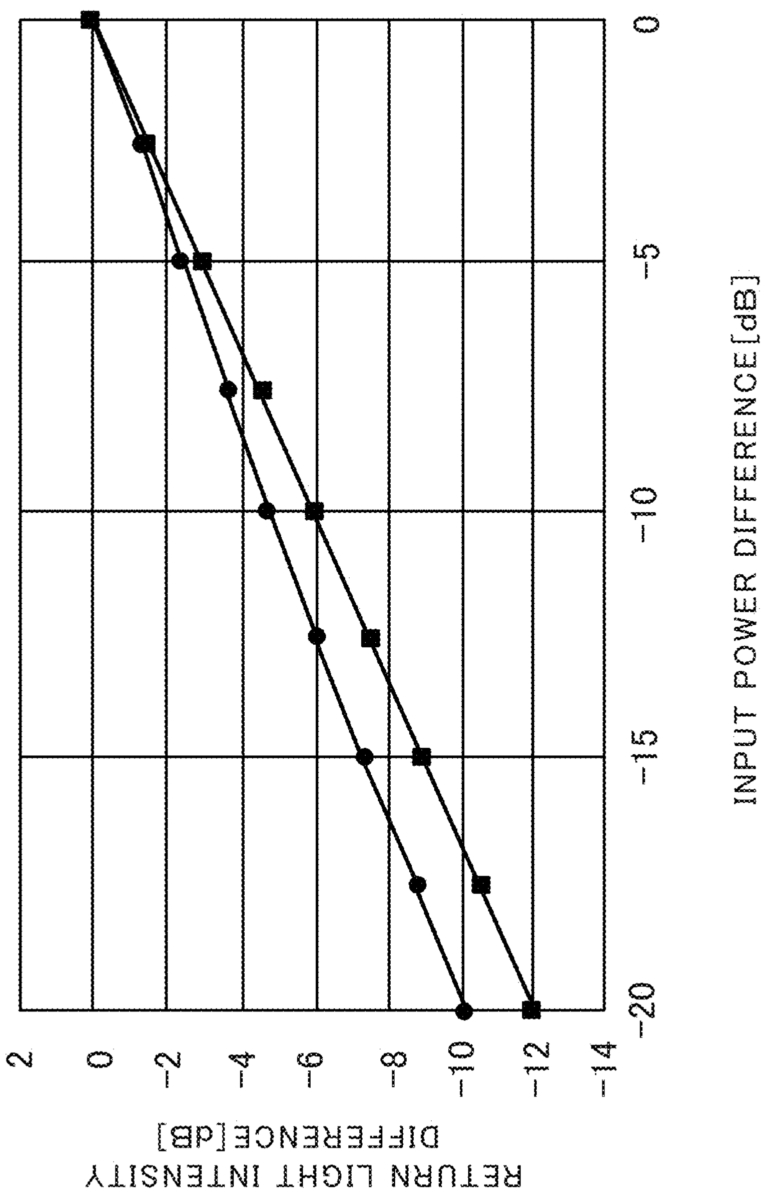
FIG. 7 is a diagram illustrating intensity of return light with respect to input power to an optical amplifier for describing an operation of the optical transmission path monitoring device according to the present disclosure.

FIG. 7 illustrates intensity of return light with respect to input power to an optical amplifier in each of a case where wavelength multiplexed signal light WDM is included in propagation light, and a case where wavelength multiplexed signal light WDM is not included in propagation light. A horizontal axis denotes a difference of input power to an optical amplifier with respect to rated input power, and a vertical axis denotes a difference of return light intensity with respect to a rated input time. In FIG. 7, a circle mark indicates a case where wavelength multiplexed signal light WDM is included, and a square mark indicates a case where wavelength multiplexed signal light WDM is not included. A gradient in FIG. 7 represents a gain slope variation coefficient in each of the cases. As exemplified by an example illustrated in FIG. 7, a gain slope variation coefficient has a different value depending on whether wavelength multiplexed signal light WDM is included in propagation light.

The gain slope variation coefficient changes by an amplification characteristic of an optical amplifier. Therefore, it is preferable to measure in advance a gain slope variation coefficient when an optical amplifier is evaluated alone.

Herein, the failure determination unit 1400 included in the optical transmission path monitoring device 1000 determines a failure of an optical transmission path by using a gain slope variation coefficient. Specifically, in a case where a path of signal light is in the first optical path state R1, the failure determination unit 1400 determines a failure of an optical transmission path by using a first gain slope variation coefficient being a gain slope variation coefficient associated with the first optical path state. Further, in a case where a path of signal light is in the second optical path state R2, the failure determination unit 1400 determines a failure of an optical transmission path by using a second gain slope variation coefficient being a gain slope variation coefficient associated with the second optical path state.

The failure determination unit 1400 can recognize a change amount of input power to an optical amplifier by using a relationship in FIG. 7, and from a gain slope variation coefficient associated with an optical path state, and a light intensity change amount of return light. Then, the failure determination unit 1400 can determine a type and a degree of a failure in an optical transmission path from a change amount of input power at this occasion. Further, the optical transmission path monitoring device 1000 can determine a distance to a location where monitoring light is scattered from a period of time from a time when monitoring light is sent to the optical transmission path until return light is received, and detect a failure section.

Note that, even in an optical transmission system in which an optical path switching device such as an optical switch is not included, it is possible to monitor an optical transmission path by switching to an appropriate gain slope variation coefficient, based on whether wavelength multiplexed signal light WDM is included in propagation light.

In this way, the optical transmission path monitoring device 1000 is configured in such a way as to change a gain slope variation coefficient, based on whether wavelength multiplexed signal light WDM is included in propagation light to be received from a monitoring optical transmission path. Therefore, according to the optical transmission path monitoring device 1000, it becomes possible to constantly monitor an optical transmission path by a condition optimal for determining a failure.

Further, according to the optical transmission path monitoring device 1000, it is possible to determine a failure even in a state in which a communication traffic is operated. Further, in a submarine optical cable system and the like being made freely available, it becomes possible to monitor an optical transmission path without relying on a transmission device such as a transponder.

Figure 8:
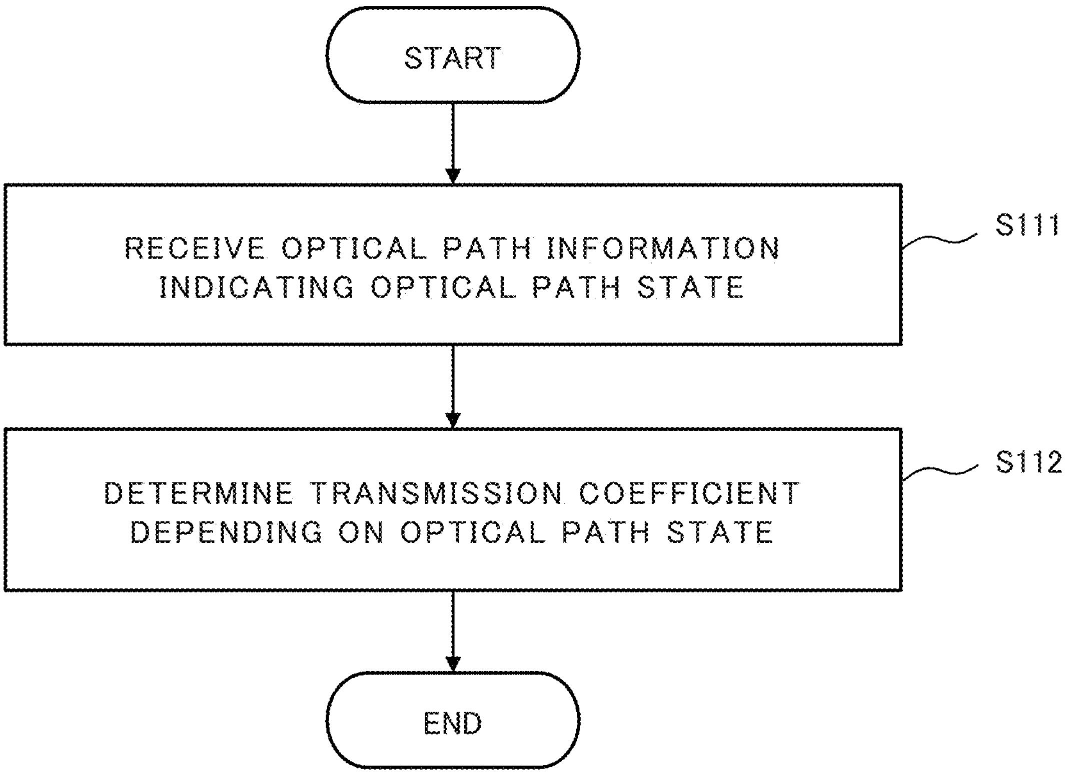
FIG. 8 is a flowchart for describing a monitoring control method according to the present disclosure.

Next, a monitoring control method according to the present example embodiment is described by using a flowchart illustrated in FIG. 8.

In the monitoring control method according to the present example embodiment, first, optical path information indicating an optical path state when a path of signal light propagating through an optical transmission path is switched is received (step S111). Then, a transmission coefficient for use in monitoring a state of the optical transmission path by monitoring light is determined depending on the optical path state (step S112).

Note that, regarding step S111, for example, a path information reception means becomes a subject for operation. Further, regarding step S112, for example, a transmission coefficient determination means becomes a subject for operation.

In this way, the monitoring control method according to the present example embodiment is configured in such a way as to determine a transmission coefficient depending on an optical path state. Therefore, even when an optical path state changes, it is possible to monitor a state of an optical transmission path by using an optimum transmission coefficient, and detect a failure. Consequently, in the monitoring control method according to the present example embodiment, it is possible to improve accuracy when a failure of an optical transmission path is determined in an optical transmission system configured in such a way as to switch a path of signal light propagating through the optical transmission path.

In the monitoring control method according to the present example embodiment, transmission coefficient information in which an optical path state and a transmission coefficient are associated with each other may be stored in advance. In this case, determining a transmission coefficient includes determining a transmission coefficient by using transmission coefficient information.

Herein, the above-described transmission coefficient includes a gain slope variation coefficient being a change amount of a gain slope in an optical amplifier with respect to input power to the optical amplifier disposed in an optical transmission path. Further, the above-described optical path information includes information indicating any of a first optical path state in which signal light is directed toward an own station, and a second optical path state in which signal light is directed toward another station.

Figure 9:
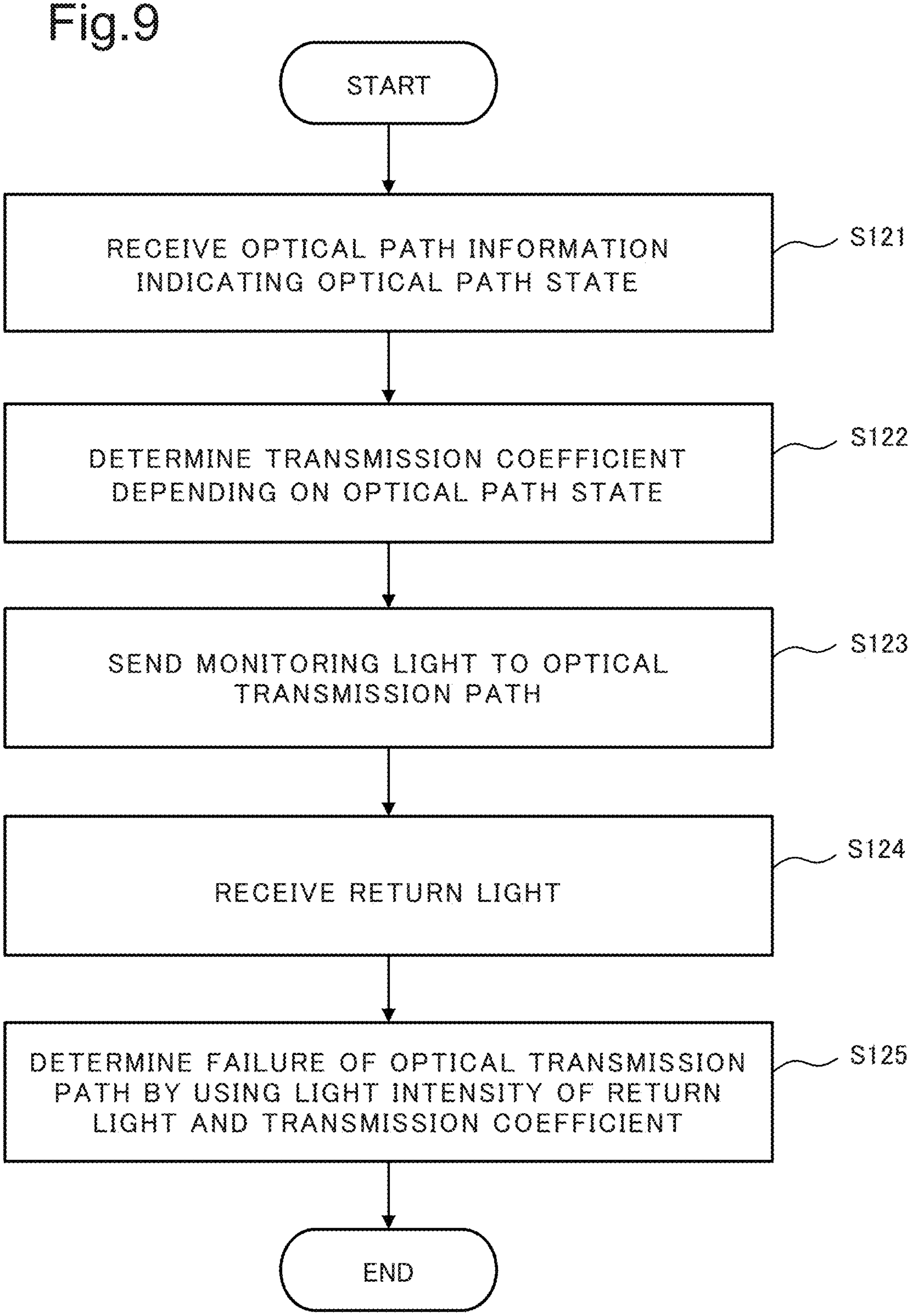
FIG. 9 is a flowchart for describing an optical transmission path monitoring method according to the present disclosure.

Next, an optical transmission path monitoring method according to the present example embodiment is described by using a flowchart illustrated in FIG. 9.

In the optical transmission path monitoring method according to the present example embodiment, first, optical path information indicating an optical path state when a path of signal light propagating through an optical transmission path is switched is received (step S121). A transmission coefficient for use in monitoring a state of the optical transmission path by monitoring light is determined depending on the optical path state (step S122). Further, monitoring light is sent to the optical transmission path (step S123). Subsequently, return light in which the monitoring light is scattered in the optical transmission path is received (step S124). Then, a failure of the optical transmission path is determined by using light intensity of the return light and the transmission coefficient (step S125).

Note that, regarding step S121, for example, a path information reception means becomes a subject for operation. Regarding step S122, for example, a transmission coefficient determination means becomes a subject for operation. Regarding step S123, for example, a monitoring light sending means becomes a subject for operation. Regarding step S124, for example, a monitoring light reception means becomes a subject for operation. Regarding step S125, for example, a failure determination means becomes a subject for operation.

In this way, the optical transmission path monitoring method according to the present example embodiment is configured in such a way that a transmission coefficient is determined depending on an optical path state, and a failure of an optical transmission is determined by using the transmission coefficient and light intensity of return light. Therefore, even when an optical path state changes, it is possible to monitor a state of an optical transmission path by using an optimum transmission coefficient, and detect a failure. Consequently, in the optical transmission path monitoring method according to the present example embodiment, it is possible to improve accuracy when a failure of an optical transmission path is determined in an optical transmission system configured in such a way as to switch a path of signal light propagating through the optical transmission path.

Herein, the above-described optical path information includes information indicating any of the first optical path state in which signal light is directed toward an own station, and the second optical path state in which signal light is directed toward another station. Then, when a path of signal light is in the first optical path state, it can be regarded that propagation light directed toward the own station includes wavelength multiplexed signal light being signal light. On the other hand, when a path of signal light is in the second optical path state, it can be regarded that propagation light does not include wavelength multiplexed signal light.

Further, the above-described transmission coefficient includes a gain slope variation coefficient being a change amount of a gain slope in an optical amplifier with respect to input power to the optical amplifier disposed in an optical transmission path. At this occasion, it can be regarded that determining a failure of an optical transmission path includes determining a failure of an optical transmission path by using a gain slope variation coefficient. Specifically, when a path of signal light is in the first optical path state, it can be regarded that a failure of an optical transmission path is determined by using the first gain slope variation coefficient being a gain slope variation coefficient associated with the first optical path state. Further, when a path of signal light is in the second optical path state, it can be regarded that a failure of an optical transmission path is determined by using the second gain slope variation coefficient being a gain slope variation coefficient associated with the second optical path state.

As described above, in the monitoring control device 100, the optical transmission path monitoring device 1000, the monitoring control method, and the optical transmission path monitoring method according to the present example embodiment, it is possible to improve accuracy when a failure of an optical transmission path is determined in an optical transmission system configured in such a way as to switch a path of signal light propagating through the optical transmission path.

Second Example Embodiment

Figure 10:
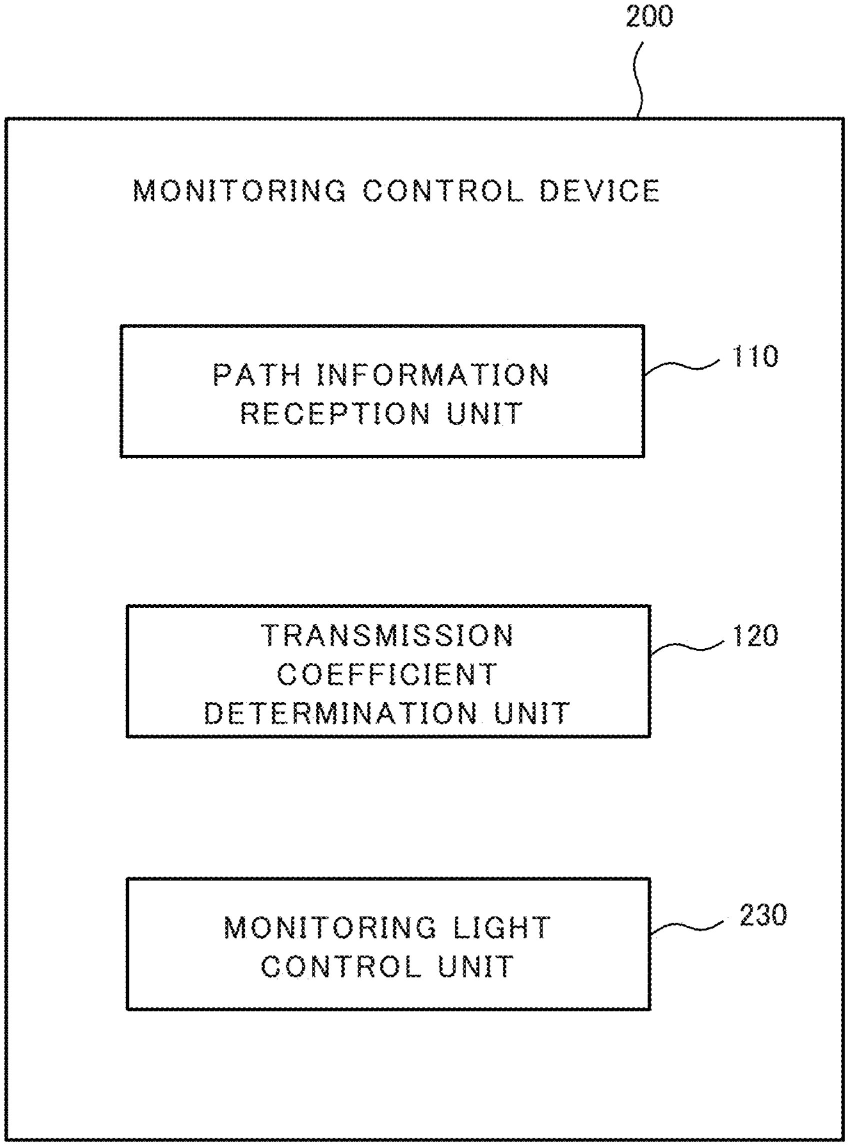
FIG. 10 is a block diagram illustrating a configuration of a monitoring control device according to the present disclosure.

Next, a second example embodiment according to the present disclosure is described. FIG. 10 illustrates a configuration of a monitoring control device 200 according to a present example embodiment. The monitoring control device 200 includes a path information reception unit (path information reception means) 110, a transmission coefficient determination unit (transmission coefficient determination means) 120, and a monitoring light control unit (monitoring light control means) 230. The monitoring control device 200 is used in an optical transmission system configured in such a way as to switch a path of signal light propagating through an optical transmission path.

The path information reception unit 110 receives optical path information indicating an optical path state when a path of signal light propagating through an optical transmission path is switched. Then, the transmission coefficient determination unit 120 determines a transmission coefficient for use in monitoring a state of the optical transmission path by monitoring light depending on the optical path state.

A configuration so far is similar to a configuration of the monitoring control device 100 according to the first example embodiment. The monitoring control device 200 according to the present example embodiment is configured to further include the monitoring light control unit 230 for determining whether to insert monitoring light into an optical transmission path.

In this way, the monitoring control device 200 according to the present example embodiment is configured in such a way that the transmission coefficient determination unit 120 determines a transmission coefficient depending on an optical path state. Therefore, even when an optical path state changes, it is possible to monitor a state of an optical transmission path by using an optimum transmission coefficient, and detect a failure. Consequently, in the monitoring control device 200 according to the present example embodiment, it is possible to improve accuracy when a failure of an optical transmission path is determined in an optical transmission system configured in such a way as to switch a path of signal light propagating through the optical transmission path.

Further, the monitoring control device 200 according to the present example embodiment is configured in such a way that the monitoring light control unit 230 determines whether to insert monitoring light into an optical transmission path. Therefore, since a state in which monitoring light from a different terminal station simultaneously propagates through an optical transmission path can be avoided, it is possible to allocate a same wavelength to the monitoring light. Consequently, it becomes possible to perform monitoring of an optical transmission path by a simple device.

Figure 11:
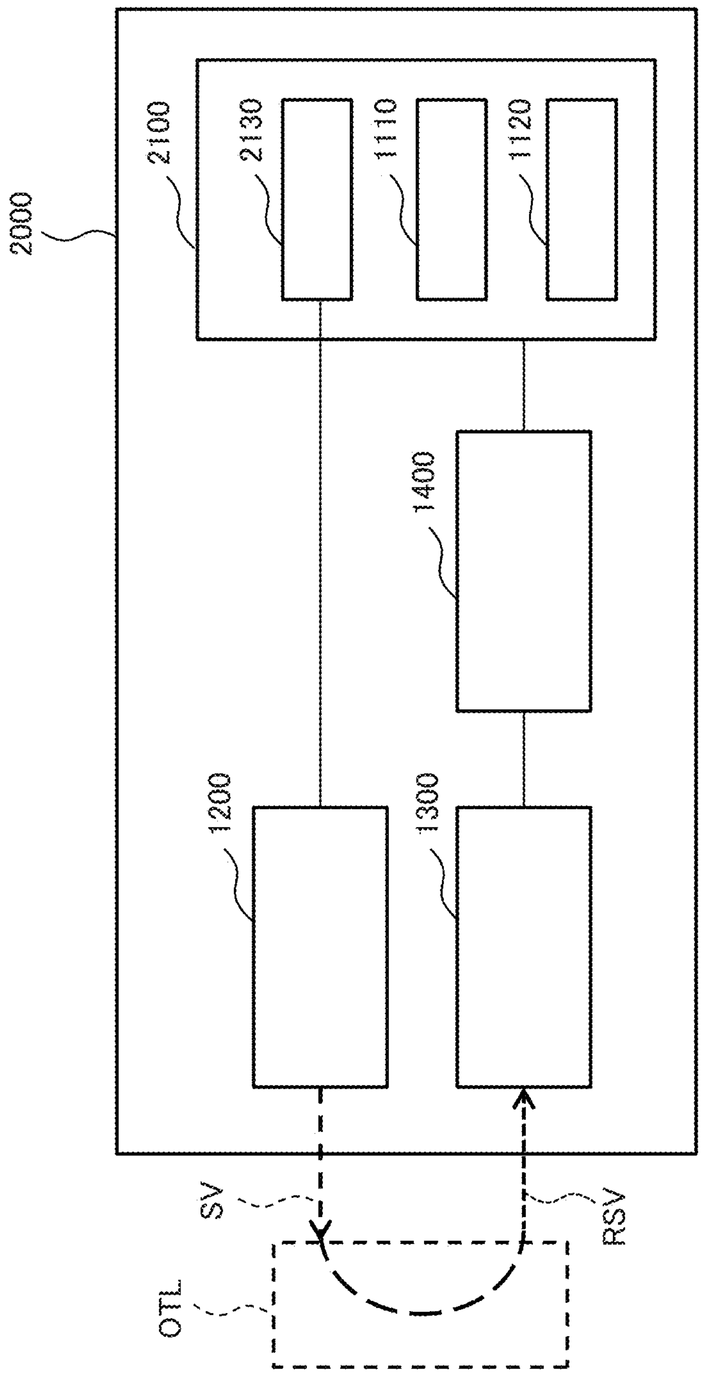
FIG. 11 is a block diagram illustrating a configuration of an optical transmission path monitoring device according to the present disclosure.

FIG. 11 illustrates a configuration of an optical transmission path monitoring device 2000 including the above-described monitoring control device. The optical transmission path monitoring device 2000 includes a monitoring control device 2100, a monitoring light sending unit (monitoring light sending means) 1200, a monitoring light reception unit (monitoring light reception means) 1300, and a failure determination unit (failure determination means) 1400. A configuration of the monitoring control device 2100 is similar to a configuration of the above-described monitoring control device 200, and includes a path information reception unit 1110, a transmission coefficient determination unit 1120, and a monitoring light control unit 2130.

The monitoring light sending unit 1200 sends monitoring light SV to an optical transmission path OTL. The monitoring light reception unit 1300 receives return light RSV in which the monitoring light SV is scattered in the optical transmission path OTL. The failure determination unit 1400 determines a failure of an optical transmission path by using light intensity of the return light RSV and a transmission coefficient. Then, the monitoring light control unit 2130 included in the monitoring control device 2100 determines whether to insert the monitoring light SV into the optical transmission path OTL.

The monitoring light control unit 2130 can be configured in such a way as to instruct the monitoring light sending unit 1200 not to insert monitoring light SV, when a path of signal light is in a first optical path state. The first optical path state is an optical path state in which signal light is directed toward an own station. Further, the monitoring control device 2100 can be configured in such a way as to instruct the monitoring light sending unit 1200 to insert monitoring light SV, when a path of signal light is in a second optical path state. The second optical path state is an optical path state in which signal light is directed toward another station. Herein, it can be regarded that a wavelength of monitoring light SV is equal to a wavelength of opposite-side monitoring light to be sent from an opposing station.

Next, an operation of the optical transmission path monitoring device 2000 according to the present example embodiment is described in further detail. Herein, as illustrated in FIG. 4, a case where the optical transmission path monitoring device 2000 is included in terminal stations A, B, and C is described as an example.

Figure 12A:
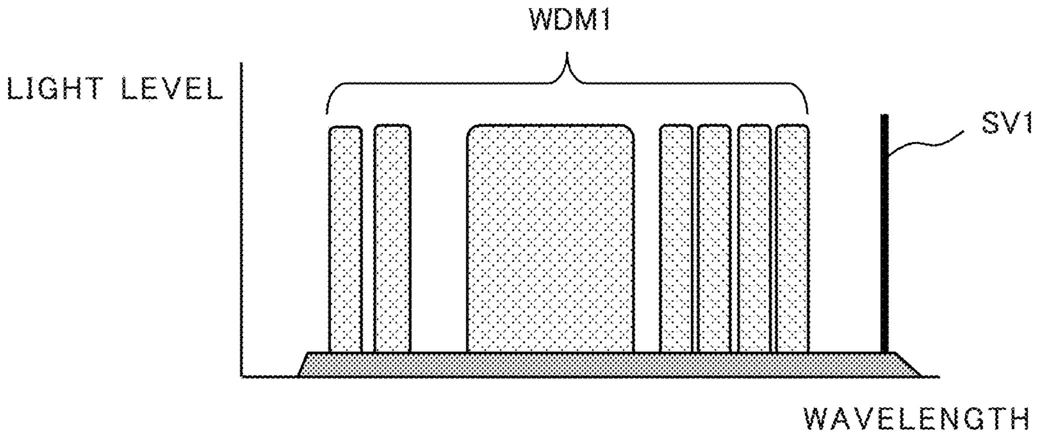
FIG. 12A is a diagram schematically illustrating a light spectrum of transmission light to be sent from a terminal station A in an optical transmission system in which the optical transmission path monitoring device according to the present disclosure is used.
Figure 12B:
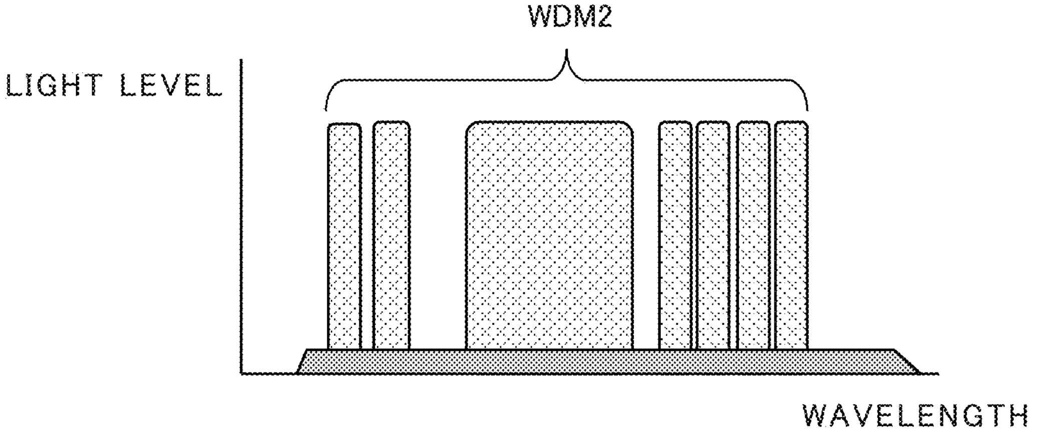
FIG. 12B is a diagram schematically illustrating a light spectrum of transmission light to be sent from a terminal station B in the optical transmission system in which the optical transmission path monitoring device according to a second example embodiment of the present disclosure is used.
Figure 12C:
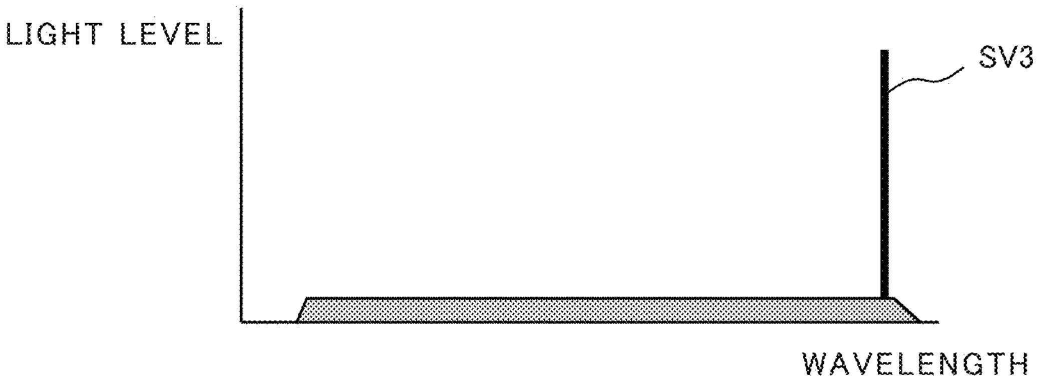
FIG. 12C is a diagram schematically illustrating a light spectrum of transmission light to be sent from a terminal station C in the optical transmission system in which the optical transmission path monitoring device according to the present disclosure is used.

FIGS. 12A, 12B, and 12C schematically illustrate a light spectrum of transmission light TL to be sent from each of the terminal stations A, B, and C, when a switching state of an optical path switching device 11 is a first optical path state R1. Herein, it is assumed that a wavelength of monitoring light SV to be inserted from the terminal stations A, B, and C by the monitoring light sending unit 1200 included in the optical transmission path monitoring device 2000 is equal to one another.

As illustrated in FIG. 12A, monitoring light SV1 is sent together with wavelength multiplexed signal light WDM1 from the terminal station A. Since a path of signal light is in the first optical path state R1, the monitoring light control unit 2130 of the optical transmission path monitoring device 2000 included in the terminal station B instructs the monitoring light sending unit 1200 not to insert monitoring light. Therefore, as illustrated in FIG. 12B, only wavelength multiplexed signal light WDM2 is sent from the terminal station B. On the other hand, since a path is not selected in the terminal station C, there is no likelihood that wavelength multiplexed signal light WDM is sent, and as illustrated in FIG. 12C, only monitoring light SV3 is sent from the terminal station C.

Figure 13A:
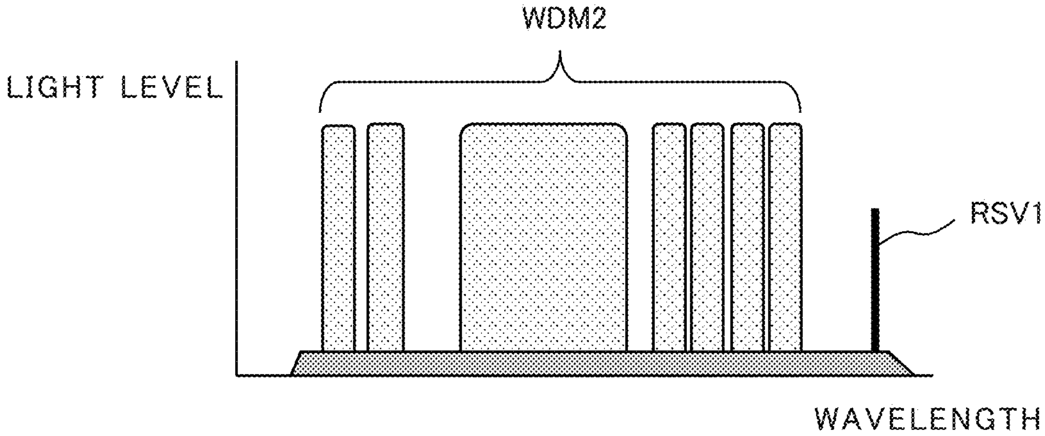
FIG. 13A is a diagram schematically illustrating a light spectrum of propagation light to be received by the terminal station A in the optical transmission system in which the optical transmission path monitoring device according to the present disclosure is used.
Figure 13B:
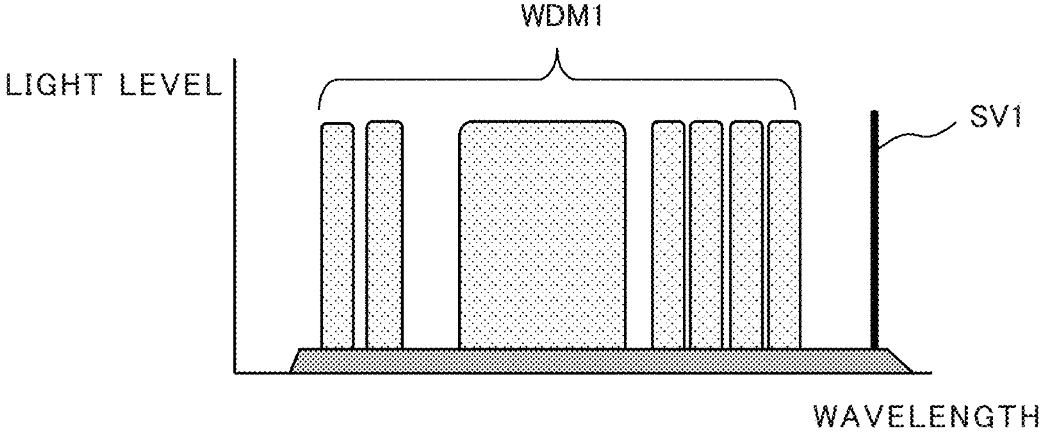
FIG. 13B is a diagram schematically illustrating a light spectrum of propagation light to be received by the terminal station B in the optical transmission system in which the optical transmission path monitoring device according to the present disclosure is used.
Figure 13C:
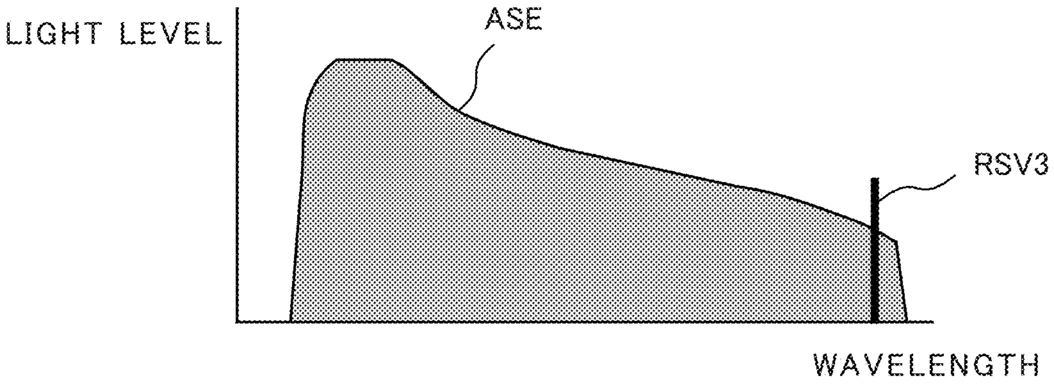
FIG. 13C is a diagram schematically illustrating a light spectrum of propagation light to be received by the terminal station C in the optical transmission system in which the optical transmission path monitoring device according to the present disclosure is used.

FIGS. 13A, 13B, and 13C schematically illustrate a light spectrum of propagation light to be received by each of the terminal stations A, B, and C, when a switching state of the optical path switching device 11 is the first optical path state R1. In this case, the terminal station A in which a path is selected receives return light RSV1 by monitoring light SV1 from the own station together with wavelength multiplexed signal light WDM2 from the terminal station B. Further, the terminal station B in which a path is selected receives monitoring light SV1 from the terminal station A together with wavelength multiplexed signal light WDM1 from the terminal station A. In contrast, since a path is not selected in the terminal station C, there is no likelihood that the terminal station C receives wavelength multiplexed signal light WDM. The terminal station C receives ASE light to be output from an optical amplifier included in an optical repeater 12, and return light RSV3 by monitoring light SV3 from the own station.

In this way, when the optical path switching device 11 is in a switching state in which the terminal station A and the terminal station B are connected to each other, for example, only the optical transmission path monitoring device 2000 included in the terminal station A performs monitoring of an optical transmission path. Alternatively, the optical transmission path monitoring device 2000 included in each of the terminal stations A and B may alternately monitor an optical transmission path. At this occasion, the optical transmission path monitoring device 2000 included in the terminal station C constantly performs monitoring of an optical transmission path.

Note that, even when a switching state of the optical path switching device 11 becomes a second optical path state R2, although a light spectrum in the terminal stations B and C is replaced, a similar result is acquired.

In this way, when a path of signal light is in the first optical path state R1, propagation light directed toward the own station includes wavelength multiplexed signal light WDM being signal light. On the other hand, when a path of signal light is in the second optical path state R2, propagation light directed toward the own station does not include wavelength multiplexed signal light WDM. Therefore, as described above, a transmission coefficient differs depending on an optical path state of signal light. Herein, the transmission coefficient includes a gain slope variation coefficient being a change amount of a gain slope in an optical amplifier with respect to input power to the optical amplifier disposed in an optical transmission path.

At this occasion, when a path of signal light is in the first optical path state R1, the failure determination unit 1400 included in the optical transmission path monitoring device 2000 determines a failure of an optical transmission path by using a first gain slope variation coefficient being a gain slope variation coefficient associated with the first optical path state. Further, when a path of signal light is in the second optical path state R2, the failure determination unit 1400 determines a failure of an optical transmission path by using a second gain slope variation coefficient being a gain slope variation coefficient associated with the second optical path state.

In this way, the optical transmission path monitoring device 2000 is configured in such a way as to change a gain slope variation coefficient, based on whether wavelength multiplexed signal light WDM is included in propagation light to be received from a monitoring optical transmission path. Therefore, according to the optical transmission path monitoring device 2000, it becomes possible to constantly monitor an optical transmission path by a condition optimal for determining a failure.

Further, the optical transmission path monitoring device 2000 according to the present example embodiment is configured in such a way that the monitoring light control unit 2130 determines whether to insert monitoring light into an optical transmission path. Therefore, since a state in which monitoring light from a different terminal station simultaneously propagates through an optical transmission path can be avoided, it is possible to allocate a same wavelength to the monitoring light. Consequently, it becomes possible to perform monitoring of an optical transmission path by a simple device.

Figure 14:
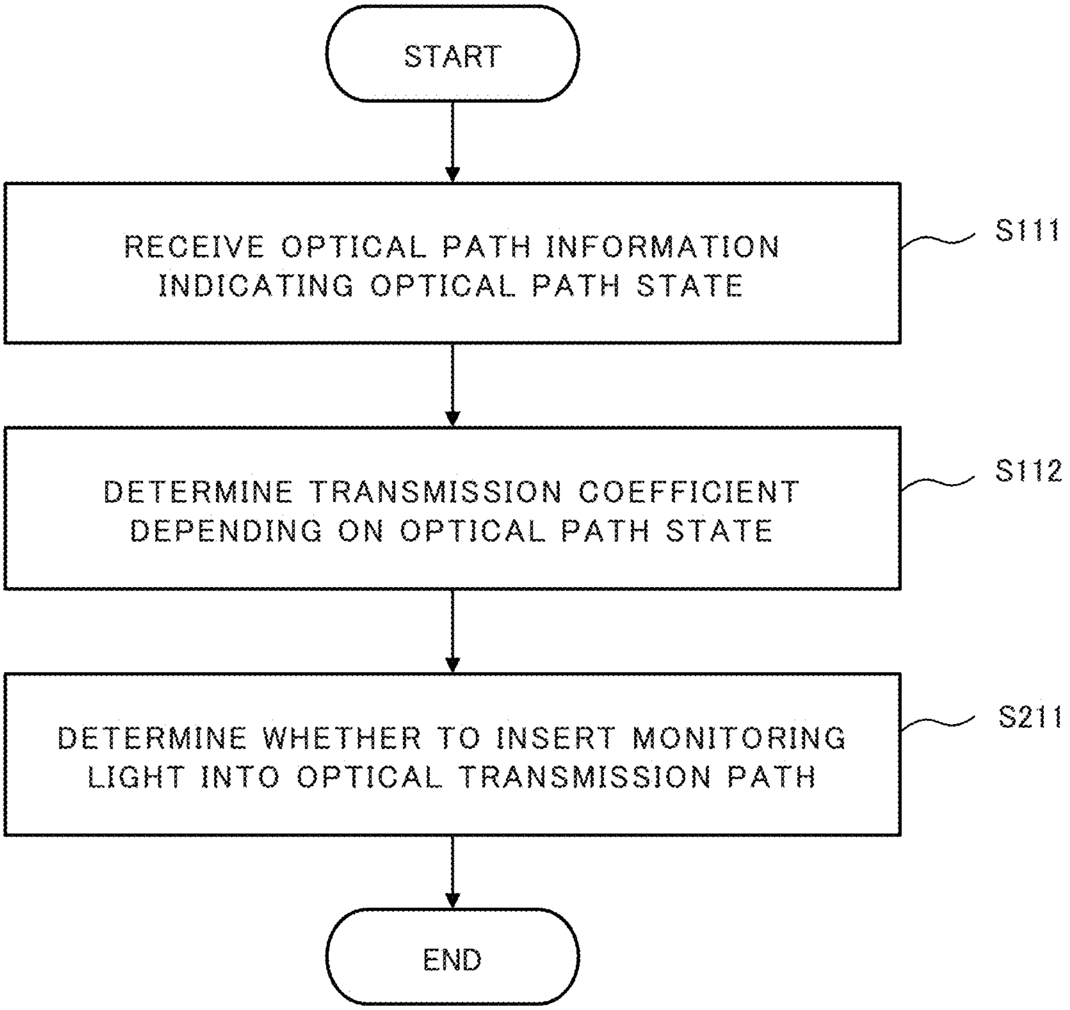
FIG. 14 is a flowchart for describing a monitoring control method according to the present disclosure.

Next, a monitoring control method according to the present example embodiment is described by using a flowchart in FIG. 14.

In the monitoring control method according to the present example embodiment, first, optical path information indicating an optical path state when a path of signal light propagating through an optical transmission path is switched is received (step S111). Then, a transmission coefficient for use in monitoring a state of the optical transmission path by monitoring light is determined depending on the optical path state (step S112).

Note that, regarding step S111, for example, a path information reception means becomes a subject for operation. Further, regarding step S112, for example, a transmission coefficient determination means becomes a subject for operation.

Steps so far are similar to those of the monitoring control method according to the first example embodiment. The monitoring control method according to the present example embodiment is configured to further include determining whether to insert monitoring light into an optical transmission path (step S211). Therefore, since a state in which monitoring light from a different terminal station simultaneously propagates through an optical transmission path can be avoided, it is possible to allocate a same wavelength to the monitoring light. Consequently, in the monitoring control method according to the present example embodiment, it becomes possible to perform monitoring of an optical transmission path by a simple device.

Note that, regarding step S211, for example, a monitoring light control means becomes a subject for operation.

Figure 15:
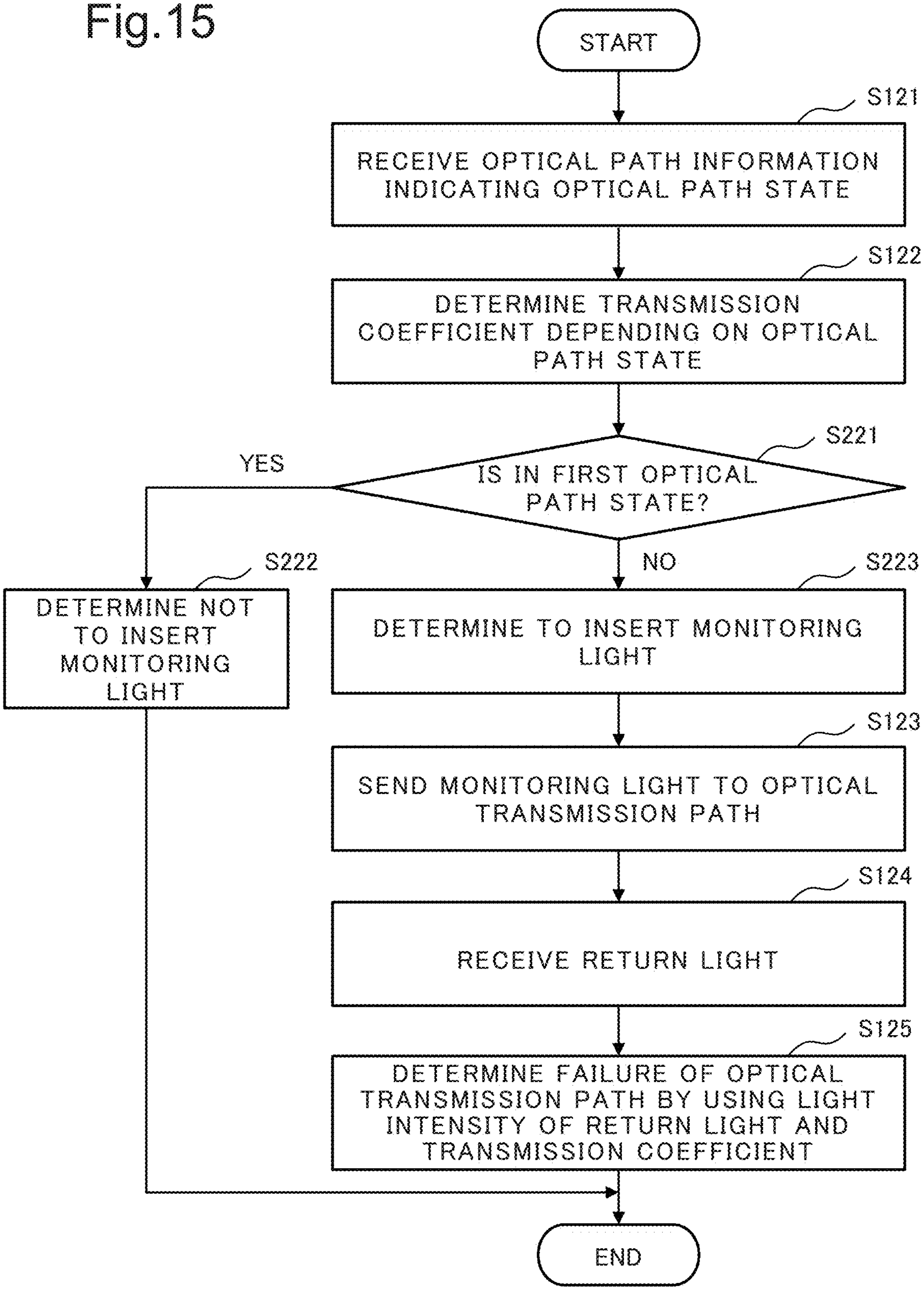
FIG. 15 is a flowchart for describing an optical transmission path monitoring method according to the present disclosure.

Next, an optical transmission monitoring method according to the present example embodiment is described by using a flowchart illustrated in FIG. 15.

In the optical transmission path monitoring method according to the present example embodiment, first, optical path information indicating an optical path state when a path of signal light propagating through an optical transmission path is switched is received (step S121). Then, a transmission coefficient for use in monitoring a state of the optical transmission path by monitoring light is determined depending on the optical path state (step S122).

Note that, regarding step S121, for example, a path information reception means becomes a subject for operation. Further, regarding step S122, for example, a transmission coefficient determination means becomes a subject for operation.

Steps so far are similar to those of the optical transmission path monitoring method according to the first example embodiment. The optical transmission path monitoring method according to the present example embodiment is configured to further include determining whether to insert monitoring light into an optical transmission path.

Specifically, it is determined whether a path of signal light is in the first optical path state, based on optical path information (step S221). Then, when the path of signal light is in the first optical path state (YES in step S221), it is determined not to insert monitoring light (step S222). Herein, the first optical path state is an optical path state in which signal light is directed toward the own station. In this case, processing is finished without sending monitoring light to the optical transmission path.

On the other hand, when the path of signal light is not in the first optical path state (NO in step S221), specifically, when the path of signal light is in the second optical path state, it is determined to insert monitoring light (step S223). Herein, the second optical path state is an optical path state in which signal light is directed toward another station. In this case, monitoring light is sent to the optical transmission path (step S123). At this occasion, it is possible to make a wavelength of monitoring light equal to a wavelength of opposite-side monitoring light to be sent from an opposing station.

Subsequently, return light in which the monitoring light is scattered in the optical transmission path is received (step S124). Then, a failure of the optical transmission path is determined by using light intensity of the return light and the transmission coefficient (step S125).

Note that, regarding steps S221, S222, and S223, for example, a monitoring light control means becomes a subject for operation. Regarding step S123, for example, a monitoring light sending means becomes a subject for operation. Regarding step S124, for example, a monitoring light reception means becomes a subject for operation. Regarding step S125, for example, a failure determination means becomes a subject for operation.

In this way, the optical transmission path monitoring method according to the present example embodiment is configured in such a way that a transmission coefficient is determined depending on an optical path state, and a failure of an optical transmission path is determined by using the transmission coefficient and light intensity of return light. Therefore, even when an optical path state changes, it is possible to monitor a state of an optical transmission path by using an optimum transmission coefficient, and detect a failure. Consequently, in the optical transmission path monitoring method according to the present example embodiment, it is possible to improve accuracy when a failure of an optical transmission path is determined in an optical transmission system configured in such a way as to switch a path of signal light propagating through the optical transmission path.

Further, the monitoring control method according to the present example embodiment is configured in such a way as to determine whether to insert monitoring light into an optical transmission path. Therefore, since a state in which monitoring light from a different terminal station simultaneously propagates through an optical transmission path can be avoided, it is possible to allocate a same wavelength to the monitoring light. Consequently, in the monitoring control method according to the present example embodiment, it becomes possible to perform monitoring of an optical transmission path by a simple device.

As described above, in the monitoring control device 200, the optical transmission path monitoring device 2000, the monitoring control method, and the optical transmission path monitoring method according to the present example embodiment, it is possible to improve accuracy when a failure of an optical transmission path is determined in an optical transmission system configured in such a way as to switch a path of signal light propagating through the optical transmission path.

A part or all of the above-described example embodiments may also be described as the following supplementary notes, but are not limited to the following.

(Supplementary note 1) A monitoring control device including: a path information reception means for receiving optical path information indicating an optical path state when a path of signal light propagating through an optical transmission path is switched: and a transmission coefficient determination means for determining a transmission coefficient for use in monitoring a state of the optical transmission path by monitoring light depending on the optical path state.

(Supplementary note 2) The monitoring control device according to supplementary note 1, further including a storage means for storing in advance transmission coefficient information in which the optical path state and the transmission coefficient are associated with each other, wherein the transmission coefficient determination means determines the transmission coefficient by using the transmission coefficient information.

(Supplementary note 3) The monitoring control device according to supplementary note 1 or 2, further including a monitoring light control means for determining whether to insert the monitoring light into the optical transmission path.

(Supplementary note 4) The monitoring control device according to supplementary note 1 or 2, wherein the transmission coefficient includes a gain slope variation coefficient being a change amount of a gain slope in an optical amplifier with respect to input power to the optical amplifier disposed in the optical transmission path.

(Supplementary note 5) The monitoring control device according to supplementary note 1 or 2, wherein the optical path information includes information indicating any of a first optical path state in which the signal light is directed toward an own station, and a second optical path state in which the signal light is directed toward another station.

(Supplementary note 6) An optical transmission path monitoring device including: the monitoring control device according to supplementary note 1 or 2: a monitoring light sending means for sending the monitoring light to the optical transmission path: a monitoring light reception means for receiving return light in which the monitoring light is scattered in the optical transmission path, and return light from each relay section: and a failure determination means for determining a failure of the optical transmission path by using light intensity of the return light and the transmission coefficient.

(Supplementary note 7) The optical transmission path monitoring device according to supplementary note 6, wherein the optical path information includes information indicating any of a first optical path state in which the signal light is directed toward an own station, and a second optical path state in which the signal light is directed toward another station.

(Supplementary note 8) The optical transmission path monitoring device according to supplementary note 7, wherein, when a path of the signal light is in the first optical path state, propagation light directed toward the own station includes wavelength multiplexed signal light being the signal light, and, when a path of the signal light is in the second optical path state, the propagation light does not include the wavelength multiplexed signal light.

(Supplementary note 9) The optical transmission path monitoring device according to supplementary note 7, wherein the monitoring control device further includes a monitoring light control means for determining whether to insert the monitoring light into the optical transmission path, and the monitoring light control means instructs the monitoring light sending means not to insert the monitoring light, when a path of the signal light is in the first optical path state, and instructs the monitoring light sending means to insert the monitoring light, when a path of the signal light is in the second optical path state.

(Supplementary note 10) A monitoring control method including: receiving optical path information indicating an optical path state when a path of signal light propagating through an optical transmission path is switched: and determining a transmission coefficient for use in monitoring a state of the optical transmission path by monitoring light depending on the optical path state.

(Supplementary note 11) The optical transmission path monitoring device according to supplementary note 9, wherein a wavelength of the monitoring light is equal to a wavelength of opposite-side monitoring light to be sent from an opposing station.

(Supplementary note 12) The optical transmission path monitoring device according to any one of supplementary notes 7 to 9, and 11, wherein the transmission coefficient includes a gain slope variation coefficient being a change amount of a gain slope in an optical amplifier with respect to input power to the optical amplifier disposed in the optical transmission path, and the failure determination means determines a failure of the optical transmission path by using a first gain slope variation coefficient being the gain slope variation coefficient associated with the first optical path state, when a path of the signal light is in the first optical path state, and determines a failure of the optical transmission path by using a second gain slope variation coefficient being the gain slope variation coefficient associated with the second optical path state, when a path of the signal light is in the second optical path state.

(Supplementary note 13) The monitoring control method according to supplementary note 10, further including storing in advance transmission coefficient information in which the optical path state and the transmission coefficient are associated with each other, wherein the determining the transmission coefficient includes determining the transmission coefficient by using the transmission coefficient information.

(Supplementary note 14) The monitoring control method according to supplementary note 10 or 13, further including determining whether to insert the monitoring light into the optical transmission path.

(Supplementary note 15) The monitoring control method according to any one of supplementary notes 10, 13, and 14, wherein the transmission coefficient includes a gain slope variation coefficient being a change amount of a gain slope in an optical amplifier with respect to input power to the optical amplifier disposed in the optical transmission path.

(Supplementary note 16) The monitoring control method according to any one of supplementary notes 10, and 13 to 15, wherein the optical path information includes information indicating any of a first optical path state in which the signal light is directed toward an own station, and a second optical path state in which the signal light is directed toward another station.

(Supplementary note 17) An optical transmission path monitoring method including: receiving optical path information indicating an optical path state when a path of signal light propagating through an optical transmission path is switched: determining a transmission coefficient for use in monitoring a state of the optical transmission path by monitoring light depending on the optical path state; sending the monitoring light to the optical transmission path, and receiving return light in which the monitoring light is scattered in the optical transmission path: and determining a failure of the optical transmission path by using light intensity of the return light and the transmission coefficient.

(Supplementary note 18) The optical transmission path monitoring method according to supplementary note 17, wherein the optical path information includes information indicating any of a first optical path state in which the signal light is directed toward an own station, and a second optical path state in which the signal light is directed toward another station.

(Supplementary note 19) The optical transmission path monitoring method according to supplementary note 18, wherein, when a path of the signal light is in the first optical path state, propagation light directed toward the own station includes wavelength multiplexed signal light being the signal light, and, when a path of the signal light is in the second optical path state, the propagation light does not include the wavelength multiplexed signal light.

(Supplementary note 20) The optical transmission path monitoring method according to supplementary note 18 or 19, further including: determining whether to insert the monitoring light into the optical transmission path: determining not to insert the monitoring light, when a path of the signal light is in the first optical path state; and determining to insert the monitoring light, when a path of the signal light is in the second optical path state.

(Supplementary note 21) The optical transmission path monitoring method according to supplementary note 20, wherein a wavelength of the monitoring light is equal to a wavelength of opposite-side monitoring light to be sent from an opposing station.

(Supplementary note 22) The optical transmission path monitoring method according to any one of supplementary notes 18 to 21, wherein the transmission coefficient includes a gain slope variation coefficient being a change amount of a gain slope in an optical amplifier with respect to input power to the optical amplifier disposed in the optical transmission path, and the determining a failure of the optical transmission path includes determining a failure of the optical transmission path by using a first gain slope variation coefficient being the gain slope variation coefficient associated with the first optical path state, when a path of the signal light is in the first optical path state, and determining a failure of the optical transmission path by using a second gain slope variation coefficient being the gain slope variation coefficient associated with the second optical path state, when a path of the signal light is in the second optical path state.

The previous description of embodiments is provided to enable a person skilled in the art to make and use the present disclosure.

Moreover, various modifications to these example embodiments will be readily apparent to those skilled in the art, and the generic principles and specific examples defined herein may be applied to other embodiments without the use of inventive faculty. Therefore, the present disclosure is not intended to be limited to the example embodiments described herein but is to be accorded the widest scope as defined by the limitations of the claims and equivalents.

Further, it is noted that the discloser's intent is to retain all equivalents of the claimed disclosure even if the claims are amended during prosecution.

REFERENCE SIGNS LIST

100, 200, 1100, 2100 Monitoring control device
110, 1110 Path information reception unit
120, 1120 Transmission coefficient determination unit
230, 2130 Monitoring light control unit
1000, 2000 Optical transmission path monitoring device
1200 Monitoring light sending unit
1300 Monitoring light reception unit
1400 Failure determination unit
10 Optical transmission system
11 Optical path switching device
12 Optical repeater

The invention claimed is:

1. A monitoring control device comprising:
a path information reception circuit configured to receive optical path information indicating an optical path state when a path of signal light propagating through an optical transmission path is switched; and
a transmission coefficient determination circuit configured to determine a transmission coefficient for use in monitoring a state of the optical transmission path by monitoring light depending on the optical path state.

2. The monitoring control device according to claim 1, further comprising
a storage circuit configured to store in advance transmission coefficient information in which the optical path state and the transmission coefficient are associated with each other, wherein
the transmission coefficient determination circuit determines the transmission coefficient by using the transmission coefficient information.

3. The monitoring control device according to claim 1, further comprising
a monitoring light control circuit configured to determine whether to insert the monitoring light into the optical transmission path.

4. The monitoring control device according to claim 1, wherein
the transmission coefficient includes a gain slope variation coefficient being a change amount of a gain slope in an optical amplifier with respect to input power to the optical amplifier disposed in the optical transmission path.

5. The monitoring control device according to claim 1, wherein
the optical path information includes information indicating any of a first optical path state in which the signal light is directed toward a station including the monitoring control device, and a second optical path state in which the signal light is directed toward another station.

6. An optical transmission path monitoring device comprising:
the monitoring control device according to claim 1;
a monitoring light sending circuit configured to send the monitoring light to the optical transmission path;
a monitoring light reception circuit configured to receive return light in which the monitoring light is scattered in the optical transmission path, and return light from each relay section; and
a failure determination circuit configured to determine a failure of the optical transmission path by using light intensity of the return light and the transmission coefficient.

7. The optical transmission path monitoring device according to claim 6, wherein
the optical path information includes information indicating any of a first optical path state in which the signal light is directed toward a station including the monitoring control device, and a second optical path state in which the signal light is directed toward another station.

8. The optical transmission path monitoring device according to claim 7, wherein,
when a path of the signal light is in the first optical path state, propagation light directed toward the station includes wavelength multiplexed signal light being the signal light, and,
when a path of the signal light is in the second optical path state, the propagation light does not include the wavelength multiplexed signal light.

9. The optical transmission path monitoring device according to claim 7, wherein
the monitoring control device further includes a monitoring light control circuit configured to determine whether to insert the monitoring light into the optical transmission path, and
the monitoring light control circuit
instructs the monitoring light sending circuit not to insert the monitoring light, when a path of the signal light is in the first optical path state, and instructs the monitoring light sending circuit to insert the monitoring light, when a path of the signal light is in the second optical path state.

10. The optical transmission path monitoring device according to claim 9, wherein a wavelength of the monitoring light is equal to a wavelength of opposite-side monitoring light to be sent from an opposing station.

11. The optical transmission path monitoring device according to claim 7, wherein the transmission coefficient includes a gain slope variation coefficient being a change amount of a gain slope in an optical amplifier with respect to input power to the optical amplifier disposed in the optical transmission path, and the failure determination circuit determines a failure of the optical transmission path by using a first gain slope variation coefficient being the gain slope variation coefficient associated with the first optical path state, when a path of the signal light is in the first optical path state, and determines a failure of the optical transmission path by using a second gain slope variation coefficient being the gain slope variation coefficient associated with the second optical path state, when a path of the signal light is in the second optical path state.

12. A monitoring control method comprising:

receiving optical path information indicating an optical path state when a path of signal light propagating through an optical transmission path is switched; and determining a transmission coefficient for use in monitoring a state of the optical transmission path by monitoring light depending on the optical path state.

13. The monitoring control method according to claim 12, further comprising storing in advance transmission coefficient information in which the optical path state and the transmission coefficient are associated with each other, wherein the determining the transmission coefficient includes determining the transmission coefficient by using the transmission coefficient information.

14. The monitoring control method according to claim 12, further comprising determining whether to insert the monitoring light into the optical transmission path.

15. The monitoring control method according to claim 12, wherein the transmission coefficient includes a gain slope variation coefficient being a change amount of a gain slope in an optical amplifier with respect to input power to the optical amplifier disposed in the optical transmission path.

16. The monitoring control method according to claim 12, wherein the optical path information includes information indicating any of a first optical path state in which the signal light is directed toward a station where the monitoring control method is performed, and a second optical path state in which the signal light is directed toward another station.

17. An optical transmission path monitoring method comprising:

receiving optical path information indicating an optical path state when a path of signal light propagating through an optical transmission path is switched;

determining a transmission coefficient for use in monitoring a state of the optical transmission path by monitoring light depending on the optical path state;

sending the monitoring light to the optical transmission path, and receiving return light in which the monitoring light is scattered in the optical transmission path; and determining a failure of the optical transmission path by using light intensity of the return light and the transmission coefficient.

18. The optical transmission path monitoring method according to claim 17, wherein the optical path information includes information indicating any of a first optical path state in which the signal light is directed toward a station where the optical transmission path monitoring method is performed, and a second optical path state in which the signal light is directed toward another station.

19. The optical transmission path monitoring method according to claim 18, wherein, when a path of the signal light is in the first optical path state, propagation light directed toward the station includes wavelength multiplexed signal light being the signal light, and, when a path of the signal light is in the second optical path state, the propagation light does not include the wavelength multiplexed signal light.

20. The optical transmission path monitoring method according to claim 18, further comprising:

determining whether to insert the monitoring light into the optical transmission path;

determining not to insert the monitoring light, when a path of the signal light is in the first optical path state; and determining to insert the monitoring light, when a path of the signal light is in the second optical path state.

* * * * *